US006016453A

United States Patent [19]

Pollock, Jr. et al.

[11] Patent Number: 6,016,453

[45] Date of Patent: Jan. 18, 2000

[54] METHOD FOR THE COLLECTION AND REPLAY OF SUBMARINE OPERATIONAL DATA

[75] Inventors: James S. Pollock, Jr., Portsmouth; Joan M. Cembrola, Bristol, both of R.I.

[73] Assignee: The United States of America as represented by the Secretary of the Navy, Washington, D.C.

[21] Appl. No.: 08/840,116

[22] Filed: Apr. 21, 1997

[51] Int. Cl.[7] .......................... G06F 19/00

[52] U.S. Cl. .......................... 701/21; 701/24; 701/35; 434/11; 114/312; 114/316; 89/41.01; 89/41.14; 360/5; 364/578

[58] Field of Search .......................... 701/21, 24, 35; 434/11, 13; 114/312, 314, 316; 89/5, 41.01, 41.14; 364/578; 360/5

[56] References Cited

U.S. PATENT DOCUMENTS 5,638,273 6/1997 Coiner et al. .......................... 701/35

*Primary Examiner*—William A. Cuchlinski, Jr.
*Assistant Examiner*—Yonel Beaulieu
*Attorney, Agent, or Firm*—Michael J. McGowan; Robert W. Gauthier; Prithvi C. Lall

[57] ABSTRACT

A method for recording operational data relating to submarine operations is provided including means for playing back the recorded data thereby providing a near real time playback and analysis for the submarine's crew and/or shore based facilities.

20 Claims, 7 Drawing Sheets

METHOD FOR THE COLLECTION AND REPLAY OF SUBMARINE OPERATIONAL DATA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a method for collecting submarine operational performance data and playing back of such data, and more specifically, to a system and method wherein the participating crews and/or other analyzing personnel may review the performance of each individual crew and/or the performance of all mission participating crews as a team in near real time.

(2) Description of the Prior Art

The roles and missions of fast attack submarines in the United States Navy have changed dramatically during the past several years. Where independent operations had previously been the focus of the submarine force, the emphasis today is on coordinated and joint operations. The complexities of littoral warfare, the advantages of a coordinated strike, the increasing threat of mines and the general transition toward joint operations have made it increasingly important for the submarine to operate effectively with other weapon platforms in variety of roles and changing types of conflicts.

To maintain an effective, well-trained submarine force which is prepared to operate in a variety of roles and conflict types, the Navy conducts a number of training exercises each year. One of the primary objectives of such exercises is to review the operational performance of a platform during the exercise including assessing system performance, weapon placement accuracy, tracking, tactical control, and the cooperation among forces. Timely flow of operational data to and from the submarine contributes to and enhances the value of training and tactical exercises. Specifically, efficient data flow supports timely ownship performance analysis (on board or at a shore facility) both during and after the completion of exercises.

Current methods for the collection and analysis of training data consist of manually downloading data from several systems onboard the submarines after they have completed the exercise and pulled back to the pier and gathering positional data from test ranges. After the data has been collected, pertinent data is extracted from each of the sources and merged to create a history of the exercise. After the exercise history is compiled, analysis products and detailed exercise reports are generated using data from the exercise history to provide feedback to the participants. However, each system onboard a submarine typically provides data in a different format and on different media than other systems which introduces delays and the possibility of errors. Additionally, some of the data gathered from participating submarines is contained in handwritten logs which may themselves be incomplete or illegible. Furthermore, delays and errors associated with manually transferring data using tapes and paper logs can cloud the data picture, making analysis more difficult for the shore facility.

With current methods, detailed exercise reports often arrive weeks or even months after completion of an exercise, and by the time of arrival, the crew is involved in other operations. Thus the report loses much of its impact. Additionally, during battle group exercises, battle group commanders often have unanswered questions about the location and actions of assigned participants and how they relate to their Ownship performance. Timely answers to such questions would improve the value and impact of the training exercises.

Thus what is needed is a means to enhance training and tactical exercises and to enhance reporting by providing near real-time evaluation and analysis of weapon platform and system performance.

SUMMARY OF THE INVENTION

Accordingly a general purpose and object of the present invention is to provide a system and method for collecting, storing, and reviewing the operational performance of a Naval platform during an operational exercise.

Another object of the present invention is to provide a system and method to capture, store and replay submarine operational data on board and in near real-time.

A further object of the present invention is the provision of a system and method to capture, store and transfer data between battle group commanders during an exercise.

Disclosed and taught herein is a submarine mission Reconstruction and Analysis Playback (RECAP) program integrated into a shipboard computer system. The RECAP program is primarily intended for use on a shipboard computer platform, integrated into the shipboard central computer system, and having, at least, an internal hard drive and a 3.5 inch floppy disc drive. Such a computer platform may comprise a typical personal computer (PC), a TAC3 work station and/or any other suitable microprocessing hardware.

The shipboard central computer system linked with the radio room facilities is relied upon to provide the mechanism for transmission of data collected, onboard the submarine, to a shore facility for post exercise analysis.

The RECAP program provides a method for collecting, storing and replaying, on board, submarine operational data. The RECAP program provides near real time availability of mission data play back and analysis thereby providing near instantaneous feedback of mission performance to operational crews that can be used as a lesson for the following engagement thereby increasing the overall exercise performance.

The RECAP program provides three basic operational modules, an ARCHIVE module, a COMMS, or communication module, and a REPLAY module.

The ARCHIVE module provides the operator with tactical data recording. The operator may select the types of data to be recorded. Ownship weapon presetting and contact solution track data may be automatically extracted from the ships combat system, and stored within a data file archive LIBRARY. Additional pertinent data, not otherwise automatically recorded, may be entered manually by the operator.

The COMMS module permits the operator to generate outgoing messages from selected archive LIBRARY files. Further the COMMS module provides for the reception of incoming messages and storage thereof within the system archive LIBRARY for subsequent review and analysis.

The REPLAY module is used to select and read the appropriate exercise data files, previously stored within the system archive LIBRARY, thereby permitting review and analysis of mission performance.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
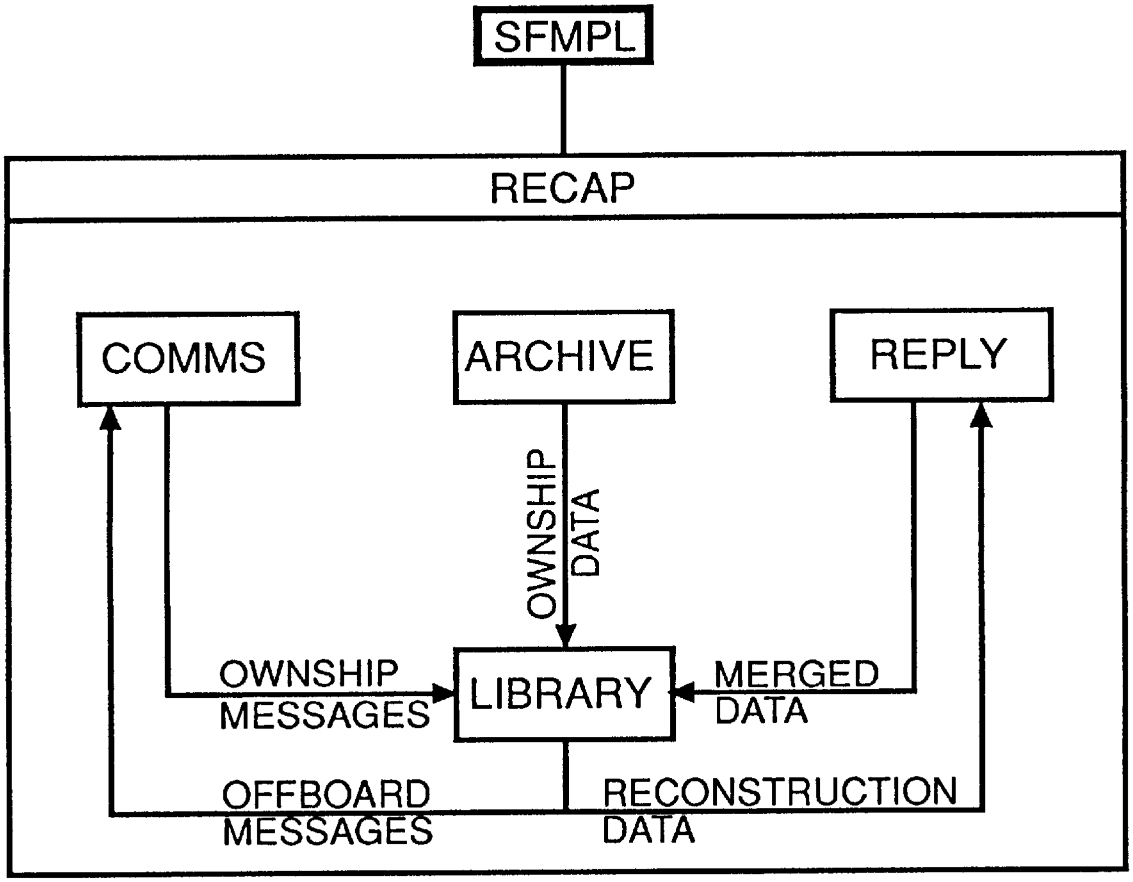
FIG. 1 is a flow diagram illustrating the modular components of the RECAP system.

The RECAP system as disclosed and taught hereinafter comprises a three module submarine fleet operational data system for receiving, processing, storing and transmitting weapon platform performance data during a naval operational exercise. In addition to the preceding functions, the system's stored operational data may be reviewed and studied during or after the exercise to analyze the performance of a participating weapon platform for crew debriefing and/or training. FIG. 1 generally illustrates the overall operational system, its components and the interaction of its components. The RECAP-system is preferably an integral part of the ship's Sub Fleet Mission Program Library (SFMPL) and comprises a communications support or COMMS module, an data receiving and storing or ARCHIVING module, and a mission reconstruction or REPLAY module. As illustrated in FIG. 1, messages received from other platforms, "Offboard Messages" are processed and conveyed to the archive LIBRARY for storage and later retrieval. Also onboard messages are conveyed to the COMMS module for dispatch to other operational platforms. Ownship data is collected, processed and conveyed to the archive LIBRARY through the ARCHIVING module. Thus fleet exercise data is stored within the archive LIBRARY from which it may be retrieved by the REPLAY module for review and/or analysis to observe the operational performance of any exercise participant. Merged data is also returned to the archive LIBRARY from the REPLAY module for subsequent recall and review.

As illustrated in FIG. 1, the operator may select one of three operational modules, the COMMS, or communication module, the ARCHIVE module, or the REPLAY module. When using either the ARCHIVE or REPLAY operational modules, any data created therein is stored within an archive file LIBRARY. Further, as illustrated in FIG. 1, data stored in the archive LIBRARY may be recalled to the REPLAY or COMMS modules for review and analysis, or off-ship transmission as will be discussed in further detail below.

It is preferred that as data is stored within the archive LIBRARY the file be limited to 1.3 megabytes. In the event data being recorded exceeds 1.3 megabytes, a new file is immediately started to receive the continuing data with an increasing numerical index appended to the original file name. Thus file lengths are limited to the capacity of one typical 3.5 inch floppy disc for operational convenience and simplicity. The archive LIBRARY files are saved to the internal hard disc of the computer platform, but may be copied directly to tape or 3.5 inch floppy disc using a utilities module not shown.

The ARCHIVE module is designed to record and store information and events that occur during the course of an exercise. In the event multiple applications and modules are running simultaneously, the ARCHIVE module operates in the background sharing processing resources to acquire and store the selected data at a rate that will allow an accurate reconstruction of the events recorded. It has been generally found that storing the selected data at ten second time intervals will provide an accurate reconstruction of the events recorded.

The ARCHIVE module generally interfaces with other onboard computers and data recording systems to periodically obtain and record information and events which occur during the course of an exercise. The information recorded may then be used by the REPLAY module to study and/or review the exercise for crew debriefing and/or training. The information may be automatically or manually recorded and generally includes Ownship course, the course of other participating platforms, information on the communication from Ownship, active sonar use, firing of weapons, length of time the sail or periscope is exposed, data on the use of weapons, and data for any contacts observed (contact track data). The ARCHIVE module obtains data, formats the data, time correlates the data and saves the data in archive files in the archive LIBRARY. Operating in this manner, the ARCHIVE module creates formatted, operation history files in near real-time which are available for review and analysis as they are created.

Figure 2:
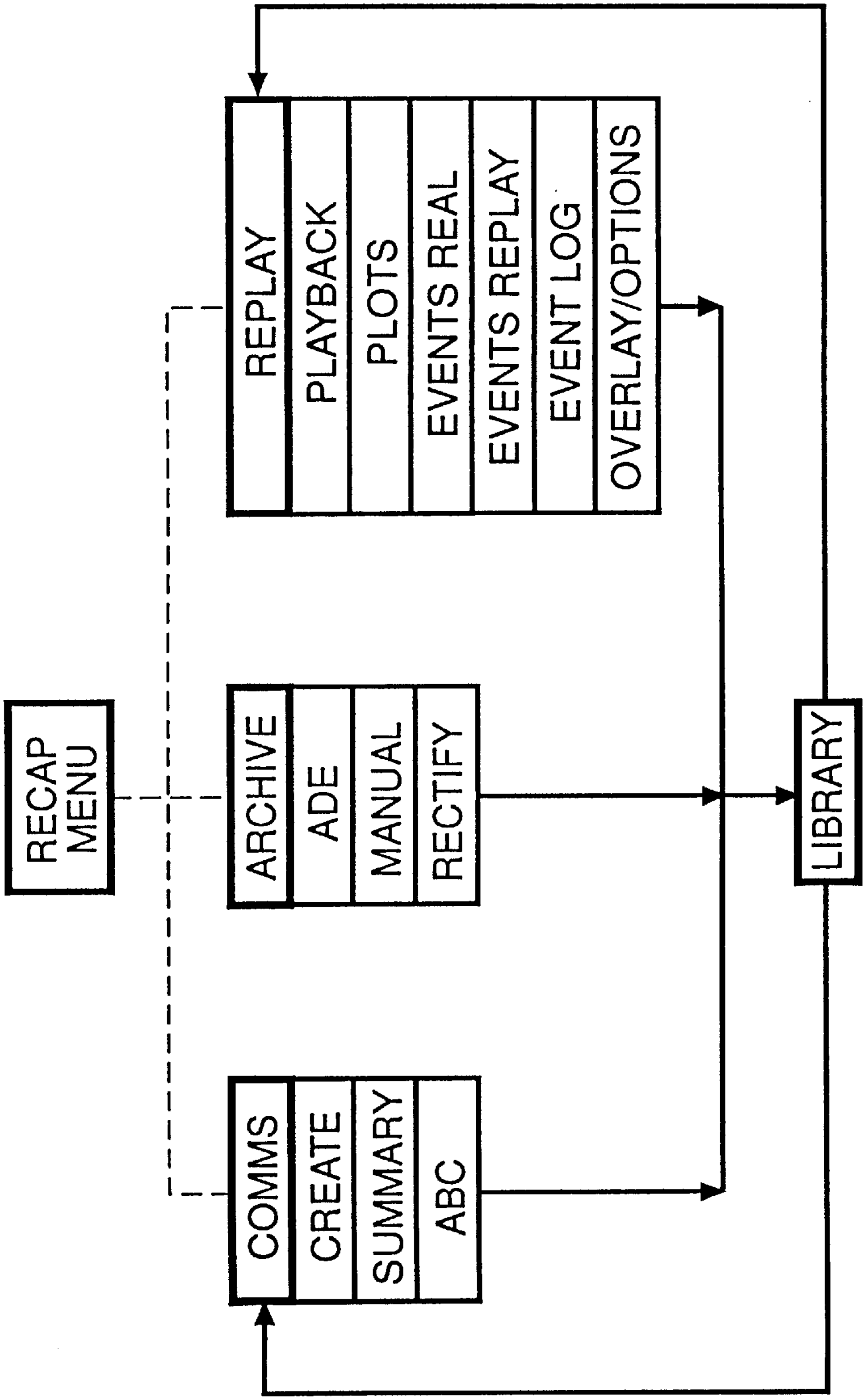
FIG. 2 presents a flow chart for explaining the processing of the RECAP program's COMMS, ARCHIVE, and REPLAY modules.
Figure 3:
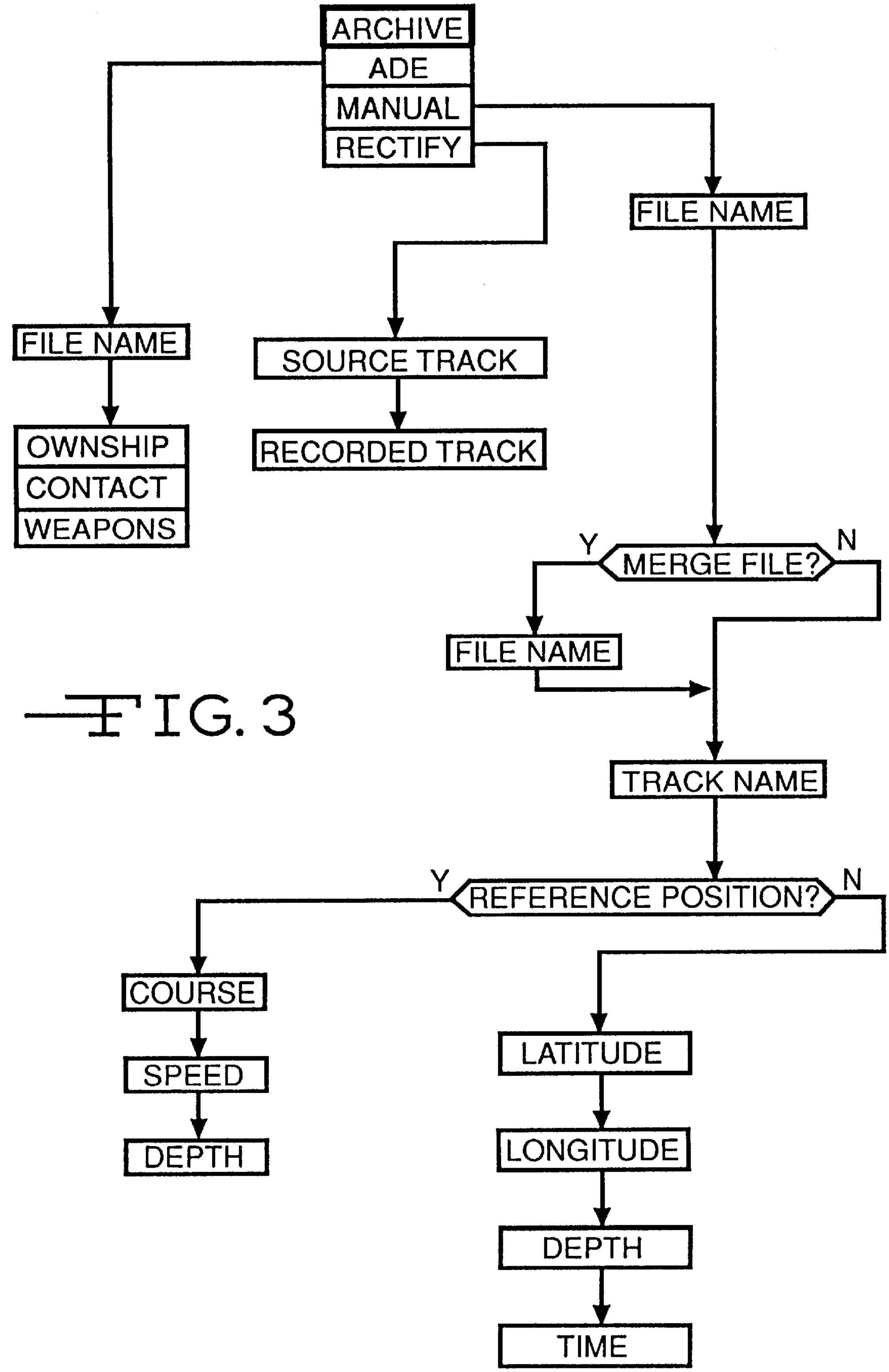
FIG. 3 presents a flow chart for explaining the processing of the ARCHIVE module.

Referring now to FIGS. 2 and 3, when the operator selects the ARCHIVE module the system presents three applications, ADE (Automatic Data Entry), MANUAL, or RECTIFY.

When selecting the ADE option the RECAP program may be used to extract selected ownship navigation, weapon, and sensor data stored within the ship's onboard computer systems such as fire control and sonar systems (not shown) by automatic data entry interfaces with these systems.

The ADE option, when selected, will continue to operate in the background periodically automatically recording the selected data directly from various integrated computer systems. The ADE option formats and time correlates the data such that the data can be tracked over a common time frame and stores it in the archive LIBRARY. The ADE operations can continue to operate while the COMMS module is being used to send or receive information as well as while REPLAY operations are being performed.

After assigning a file name, for archiving the selected data, the operator selects the data types to be archived within the archive LIBRARY. As seen in FIG. 3, typical data types include, but are not necessarily limited to: OWNSHIP data, CONTACT data, WEAPON system data, and communication data.

The OWNSHIP data option extracts and stores, in the archive LIBRARY, data such as the ship's course, speed, depth, latitude, and longitude as a function of time.

The CONTACT option extracts data relating to contacts as observed by the Ownship's data gathering systems such as the Ownship's sonar system and/or towed information gathering arrays. Additionally, data processed to obtain contact state information such as bearing, bearing rate, range, range rate and depression/elevation angle and classification information such as emitted frequency and tonals may be collected from a combat control system.

The WEAPONS option records, at the time of firing, torpedo firing data such as: time of fire, Ownship course, speed, and depth; target solution bearing, range, course, and speed; weapon type; tube; and a complete list of applicable torpedo presets. Post-launch weapon telemetry data is also recorded and includes weapons position and milestone status.

The communication option records information relating to the use of the communication system and archives information such as type of message sent, time message sent, length of message, and transmit time. The ADE operations permit the simultaneous collection of data from any of the above-mentioned data types and stores the data in one or more ARCHIVE file types concurently. Thus, the Ownship data can be stored in one archive file and the WEAPON, CONTACT, and communication data can be stored in a second archive file.

By selecting the MANUAL archiving application the operator may manually create an archive file, for storage in the system archive LIBRARY, using data from any external source. This option is typically used to enter individual data points to create a vehicle track. The operator may enter any number of positional or heading information to create the track. All entries are to be in chronological order. Track data entered may be replayed singularly or merged into an existing archive LIBRARY file.

Upon choosing the MANUAL application the operator first enters the name of the new archive file. If the data being entered is to be merged with an existing file, the operator enters the name of the existing file and then enters the name of the track for the vehicle being entered.

The operator has the option to enter a reference position (latitude and longitude) from which the track will be calculated using subsequently entered course, speed, and depth data. However, the operator may elect to enter no reference position and enter known latitude and longitude, coordinates, for the given vehicle, as a function of time. For undersea vehicles the operator may also enter the known depth of the vehicle.

A dead reckoning selection (not shown) may be provided whereby the system will calculate a dead reckoning position, of the subject vehicle, at given time intervals between the data points manually entered.

After the operator has entered all of the desired manual data the operator enters a quit command to close the new file. If the data was selected for merging into an identified merge file at the MERGE FILE selection, the new file is merged with the named archive file within the system archive LIBRARY.

The RECTIFY application uses a source track, which is assumed to be "truth," to correct a recorded track. The source track, for example a ground truth or Global Positioning System (GPS) data, is used as a reference to rotate and/or stretch the recorded track as necessary so that points in the recorded track overlay points of the source track at corresponding times. If the selected recorded track was the Ownship track, then all solution tracks in the RECTIFY archive file are also shifted so that the range and bearing of each point from the corrected track equals the original range and bearing from the original Ownship track. If the selected track was not the Ownship track, then no other tracks in the archive file will be affected. Rectifying the Ownship track is used to remove navigational errors from the display when displaying recorded solutions and ground truth tracks together.

The COMMS module permits the operator to create messages from the system's archive LIBRARY files and/or to receive incoming messages for use with the REPLAY operation. Outgoing messages are used to transfer Ownship exercise information from the submarine to a suitably equipped shore site, other platforms participating in the exercise, or any other location as may be desired for review and/or analysis. Similarly, incoming messages containing exercise parameters are received from other operational platforms, or other suitably equipped locations, for inclusion in the archive LIBRARY for review and/or analysis. The incoming messages may be reviewed alone or may be merged with the Ownship data and reviewed together. The actual message transmission is accomplished using the Officer-Tactical Command Information Exchange System (OTCIXS) satellite communications network. The OTCIXS is an established and known military communications network and therefore, will not be further described herein.

The COMMS module is used to transmit and receive exercise data from other operational platforms. When transmitting, COMMS prompts the operator for selection of data to be transmitted, extracts the selected data from the archive LIBRARY, allows editing of the selected data, compresses the data for transmission, builds a message, using a prescribed format (preferably the Rainform Special format) and passes the formatted message to the ship's communication system to be transmitted. When receiving formatted messages from other operational platforms, the messages are unpacked, data is reconstructed, and stored in the archive LIBRARY. The Rainform Special format is perferred as it allows varied message lengths and data format. A Rainform message is typically used to provide Ownship position data, solution data, solution data on selected contacts, weapon presets and post launch telemetry feedback from the weapon, as well as any text comments to amplify, distinguish and/or explain the data. An ABC message is an automated message that provides course, speed, and depth changes for Ownship. It is used to build a track of an operating platform during data reconstruction and is a standard Navy message format that currently must be generated manually.

Figure 4:
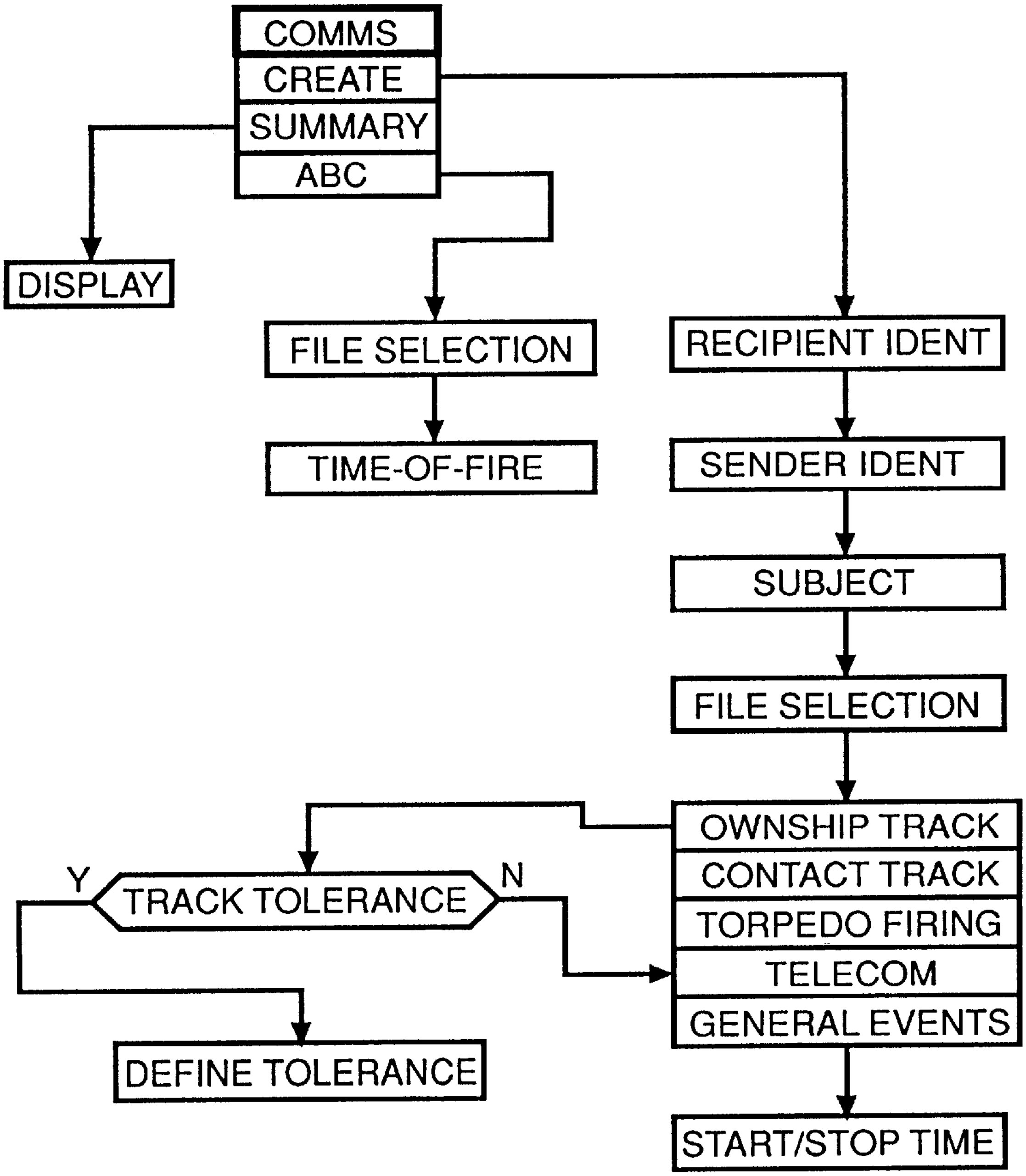
FIG. 4 presents a flow chart for explaining the processing of the COMMS module.

Referring now to FIGS. 1 and 4, when the operator selects the COMMS module the system presents three applications, CREATE RAINFORM, SUMMARY, and create ABC.

Upon selecting the CREATE RAINFORM application the operator enters general message header information identifying the intended recipient of the message, the recipient's address, the subject of the message, the type of data contained in the message and the sender.

After entering the necessary recipient and sender identification information, the operator selects the file data to be included within the message. From a listing of the archive files stored within the system archive LIBRARY the operator selects those files that contain the information that the operator desires to send to the intended recipient. Upon selecting one or more archive files the system searches the selected files and presents a listing of vehicles identified within the selected archive files. The operator selects one or more of the vehicles identified in the vehicle list.

After having selected the desired archive files and vehicles the operator selects the data types that are to be extracted from the archive files for the selected vehicles.

Available data types are generally, but not necessarily limited to, OWNSHIP TRACK data, CONTACT TRACK data, TORPEDO FIRING data, TELECOM data, and GENERAL EVENTS data. The operator also defines a limiting start and end time within which the data is extracted from the selected archive files.

Further, the operator may define an (x,y), horizontal plane, track tolerance preferably expressed as 1, 5, 10, 20, 50, or 100 yards and an altitude/depth tolerance preferably expressed in feet. Using the operator's defined track tolerance, algorithms are applied to the extracted track history for each selected vehicle whereby each track is reduced to a series of straight lines with each line spanning as many track points as possible. Any track point along the line that falls within the selected tolerance is not added to the message. The line is extended through the track history until a point falls outside the defined tolerance; a new line is then started. When the message is received by the recipient, the removed track points are reinserted by interpolation. By this process data extracted from the archive LIBRARY file is "thinned" thereby eliminating all otherwise unnecessary data from being transmitted.

Upon choosing the SUMMARY application a listing of the messages stored within the archive LIBRARY is displayed providing the source of the message, the information contained in the message and other desired identifying data.

The ABC application, of the COMMS module, is used to create a formatted message from an Ownship recorded archive LIBRARY file. The ABC message contains Ownship position data. Specifically, each time a course, speed, or depth change takes place, a new entry is added to the message. This automated capability replaces the manual ABC message generation that is a standard requirement for position reports during exercises.

The operator selects the desired archive file from a scrolled list of archive files within the archive LIBRARY and enters the "time-of-fire" of the event to be reported. An edit window is displayed whereby the operator may edit and/or add information to the formatted message. After editing the formatted message is placed in an outgoing message log for transmission by the shipboard radio room.

Incoming messages are received in the shipboard radio room and automatically parsed into archive LIBRARY files. The COMMS module reads the header information identifying the type of message, data, and sender and uses this information to create a archive LIBRARY file. The COMMS module strips the header information from the message and saves the exercise parameters transmitted within the body of the message in the proper archive file format.

The REPLAY module permits the operator to read exercise data previously recorded in the archive LIBRARY files and allows the operator to load multiple archive files making it possible to merge shipboard-gathered data with shore based, ground-truth data provided by a U.S. Navy instrumented range, for a quick look analysis and exercise debriefing. There are two types of archive files REPLAY can access: exercise files and event files. Exercise files may be generated by both shipboard systems and instrumented ranges and contain exercise and significant event data. These files may be accessed individually or played back in a time-synchronous manner. The event files provide an electronic log of significant events and notes recorded by Ownship shipboard personnel either during or after the exercise. Event files only contain events and must, therefore, be played back in conjunction with the corresponding exercise files. The REPLAY module provides both a dynamic playback mode and a static mode. In dynamic mode the exercise is replayed from beginning to end with the operator having the ability to play slow or fast and stop or pause during any segment of the exercise playback. In static mode the operator selects a "time-slice" to be reviewed.

The REPLAY module prompts for the data type and time to be replayed, retrieves the data from the archive LIBRARY, prompts for display options and data archiving options, and displays the data. The REPLAY module is designed to read the archive file format and set everything up as time triggered events. Overlay options allow the user, during replay, to turn contacts represented on the plot on or off, change their color, change the symbols associated with each contact, change the track history, change time tics, and change data rate of points plotted.

Referring now to FIG. 2, when the REPLAY module is selected the operator is presented with six applications, PLAYBACK, PLOTS, EVENTS REAL, EVENTS REPLAY, EVENT LOG, and overlay options.

Figure 5:
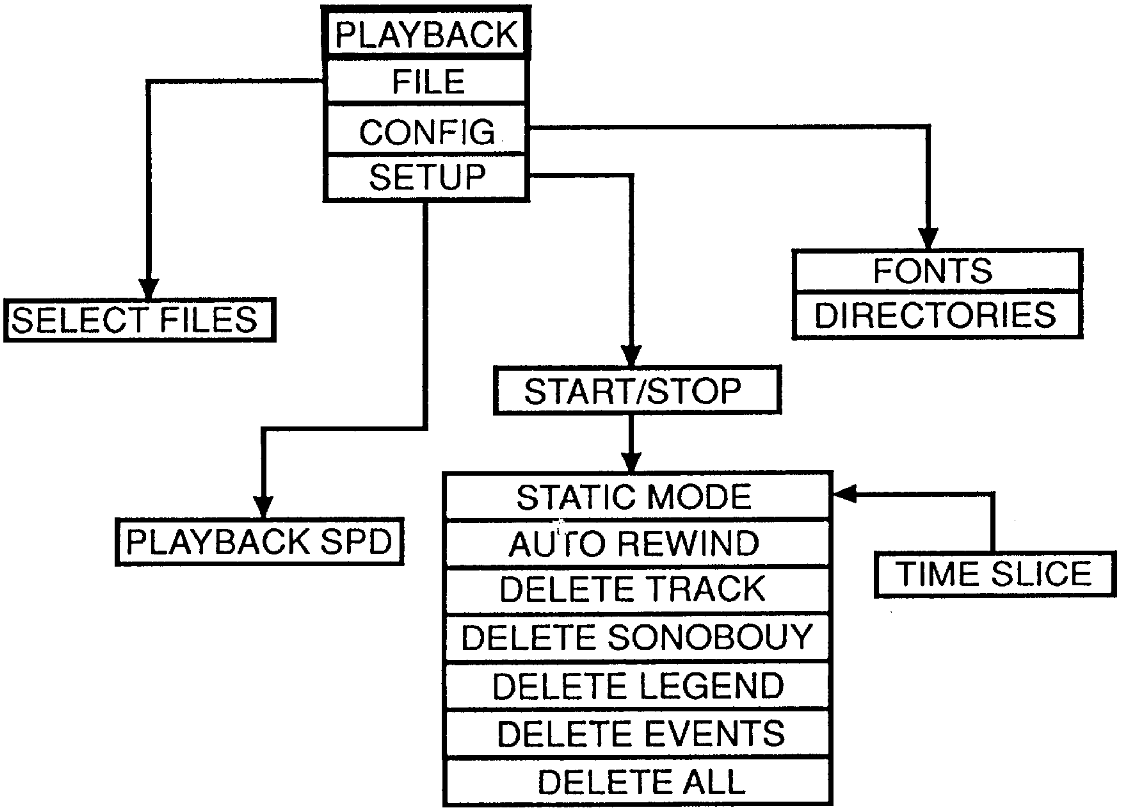
FIG. 5 present a flow chart for explaining the processing of the PLAYBACK application of the REPLAY module.

Referring additionally to FIG. 5, when the operator chooses the PLAYBACK application three options, FILE, CONFIG, and SET UP, are presented. Upon choosing the FILE option the operator selects desired files from the archive LIBRARY for analysis. Using the CONFIG operation, the operator selects available fonts and sizes for presentation of the selected data and sets the default archive file directory used to locate the desired exercise files.

The SET UP option allows the operator to set the options used in displaying the data. Upon choosing the SET UP option the operator first enters the desired start and stop times within which the desired archived mission data is to be analyzed and the operator is then provided with seven additional selections, STATIC MODE, AUTO REWIND, DELETE TRACK, DELETE SONOBUOY, DELETE LEGEND, DELETE EVENTS, and DELETE ALL.

In the STATIC MODE operation, the system will only present exercise data for defined time slices. Using the AUTO REWIND selection, the system will replay the exercise data over again once the designated end time is reached. The DELETE TRACK option is used to remove the track history data for one or more vehicles being reviewed during the file loading and review process. The DELETE SONOBUOY selection will remove the history of all sonobuoys from the data being reviewed during the file loading and review process. The DELETE LEGEND selection will remove vehicle identification information during the file loading and review process. The DELETE EVENTS selection will remove all event data from the files being reviewed during the file loading and review process. The DELETE ALL selection will remove all event, sonobuoy, vehicle identities, and vehicle positional data from the data being reviewed during the file loading and review process. Following completion of the SET UP option the operator may select the playback speed.

Referring now to FIG. 2, when the operator chooses the PLOTS application, of the REPLAY module, the operator is provided a graphical presentation of user-selected data parameters versus time. The system displays up to six separate plots within one window border. Each new plot selected by the operator is appended to the bottom of the window. Three types of data may be presented, single parameter data (e.g. altitude/depth, course, and speed) for a given platform, paired data (e.g. bearing, range, and angle on the bow) for paired platforms, and Target Motion Analysis (TMA) error data (e.g. range, bearing, course and speed). The PLOTS application provides the capability to define the platform pairings or TMA groups globally within the system; this allows the operator to enter a given platform pairing or group once and have that designated pairing or group appear on all selected pairing or group plots. Additional pairings and/or groups may be added locally, to individual plots, for analysis and/or debriefing purposes.

Figure 6:
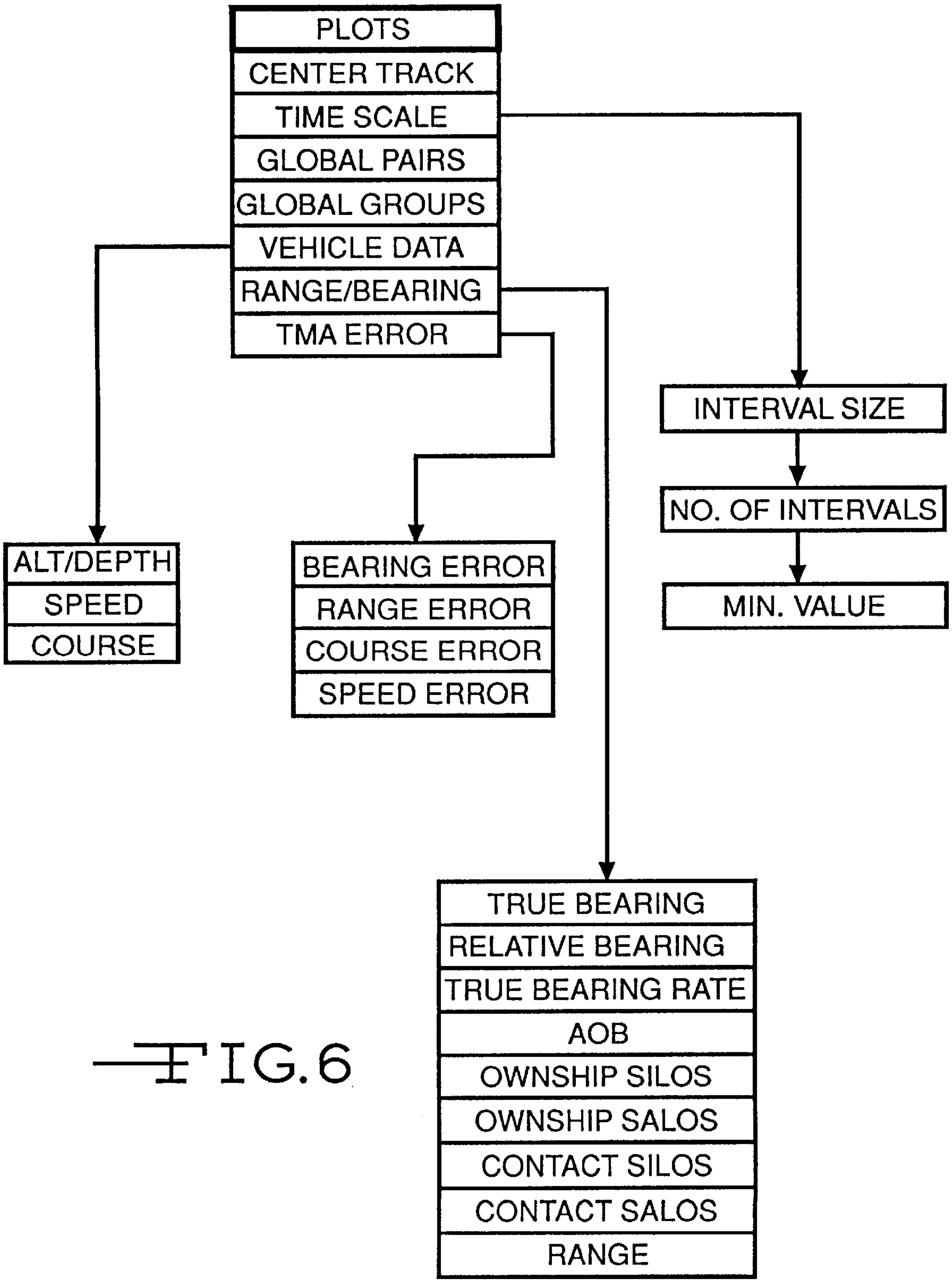
FIG. 6 presents a flow chart for explaining the processing of the PLOTS application of the REPLAY module.

Referring additionally to FIG. 6, upon selecting the PLOTS application the operator is presented with seven options, CENTER TRACK, TIME SCALE, GLOBAL PAIRS, GLOBAL GROUPS, VEHICLE DATA, RANGE/BEARING, and TMA ERROR.

When the operator selects the CENTER TRACKS option the system will shift the displayed tracks left such that the icons, for each track, are in the center of the chart display. New data points are plotted in the center of the plot with previous data points scrolling off the left side.

The TIME SCALE option allows the operator to change the time scale, with selection of time interval size and number of intervals made by entering the desired values. The minimum time value and the width of the chart may also be altered. When the operator modifies any time scale value, the system recomputes and redisplays the track for the window using the new values.

The GLOBAL PAIRS option allows the user to globally define a platform pairing that will automatically appear in all selected pairing plots as they are displayed. Similarly, the GLOBAL GROUPS option allows the user to globally define a TMA grouping that will automatically appear in all selected TMA error plots as they are displayed. When either of the GLOBAL PAIRS or GLOBAL GROUPS options are used, the system continually updates and displays as the tracks are updated.

The VEHICLE DATA option provides a submenu containing available add-on data plots presenting single data parameters (e.g. altitude/depth, speed, and course) versus time. All platforms made available by the REPLAY module will automatically be displayed on these plots.

The RANGE/BEARING option, when selected, provides the operator nine, sub-menu, add-on selections, TRUE BEARING, RELATIVE BEARING, TRUE BEARING RATE, AOB (Angle On the Bow), OWNSHIP SILOS, OWNSHIP SALOS, CONTACT SILOS, CONTACT SALOS, and RANGE.

The TRUE BEARING option will compute and display a true bearing versus time plot of one selected platform relative to another paired platform. True bearing is defined as the angle from the first platform to the second platform, in degrees, relative to true north.

The RELATIVE BEARING option computes and displays the relative bearing, in degrees, versus time of one selected platform relative to another paired platform. Relative bearing is defined as the angle from the first platform to the second platform relative to the course of the first platform.

The TRUE BEARING RATE option computes and displays the true bearing rate, in degrees per minute, versus time of one selected platform relative to another paired platform. True bearing rate is defined as the rate of change in true bearing between two platforms averaged over a one minute time interval.

The AOB selection will compute and display the "Angle On the Bow," in degrees, versus time of one selected platform relative to another paired platform. Angle on the bow is defined as the bearing from the second platform to the first platform relative to the course of the second platform.

The OWNSHIP SILOS selection will display the Ownship Speed In The Line Of Sight (SILOS), in knots, versus time of Ownship relative to another contact platform. Ownship SILOS is defined as the "Speed In the Line Of Sight" between Ownship and the contact platform.

The OWNSHIP SALOS selection will display the Ownship Speed Across The Line Of Sight (SALOS), in knots, versus time of Ownship relative to another platform. Ownship SALOS is defined as the "Speed Across the contact Line Of Sight" between Ownship and the contact platform.

The CONTACT SILOS selection will display the contact platform SILOS, in knots, versus time of a contact platform relative to Ownship. Contact SILOS is defined as the "Speed In the Line Of Sight" between a contact platform and Ownship.

The CONTACT SALOS selection will display the contact platform SALOS, in knots, versus time of Ownship relative to another contact platform. Contact SALOS is defined as the "Speed Across the Line Of Sight" between the contact platform and Ownship.

The RANGE selection will display the range, in yards, versus time of one platform relative to another platform. Range is defined as the distance from the first platform to the second platform.

The TMA ERROR option, of the PLOTS application, provides the operator a sub menu for selecting available Target Motion Analysis (TMA) data plots, BEARING ERROR, RANGE ERROR COURSE ERROR, and SPEED ERROR.

The BEARING ERROR selection will display the TMA bearing error, in degrees, versus time between an Ownship generated contact solution and the ground truth value for that contact. TMA bearing error is defined as: [true bearing of Ownship to the Ownship generated contact] minus (–) [true bearing of the ground truth Ownship to ground truth contact].

The RANGE ERROR selection will display the TMA range error, in yards, versus time between an Ownship generated contact solution and the ground truth solution for that contact. TMA range error is defined as: [range from Ownship to the Ownship generated contact] minus (–) [range from the ground truth Ownship to the ground truth contact].

The COURSE ERROR selection will display the TMA course error, in degrees, versus time between an Ownship generated contact solution and the ground truth solution for that contact. TMA course error is defined as: [course of Ownship generated contact] minus] (–) [the course of ground truth contact].

The SPEED ERROR selection will display the TMA speed error, in knots, versus time between an Ownship generated contact solution and the ground truth solution for that contact. TMA speed error is defined as: [speed of Ownship generated contact] minus (–) [the speed of ground truth contact].

During an operational exercise, key events involving vehicle platforms and participants, radio messages, weapon firings and miscellaneous notes must be time-tagged and entered into the system's archive LIBRARY. Event entries may be made in two modes of operation; (1) Realtime, when exercise data is being archived, and (2) Replay, when previously archived data is being played back for analysis. In each case event data is accepted into the archive LIBRARY creating a separate archive file. The REPLAY module accepts the events archive files as supplements to the exercise track files and allows for the presentation of the event data in a graphical and textual format.

Now referring to FIGS. 1 and 6, when the operator elects the EVENTS REAL TIME application, of the REPLAY module, two options are made available, START-NO-ARCHIVE, and START-ARCHIVE.

The START-NO-ARCHIVE option allows additional events to be entered and displayed during mission analysis and review without creating additional archive files within the archive LIBRARY. This option is only available during a review and analysis of previously stored exercise data.

The START-ARCHIVE operation creates an archive file within the archive LIBRARY and stores therein all events entered during the event entry session. This option is available during both the realtime and data review mode of operation.

Figure 7:
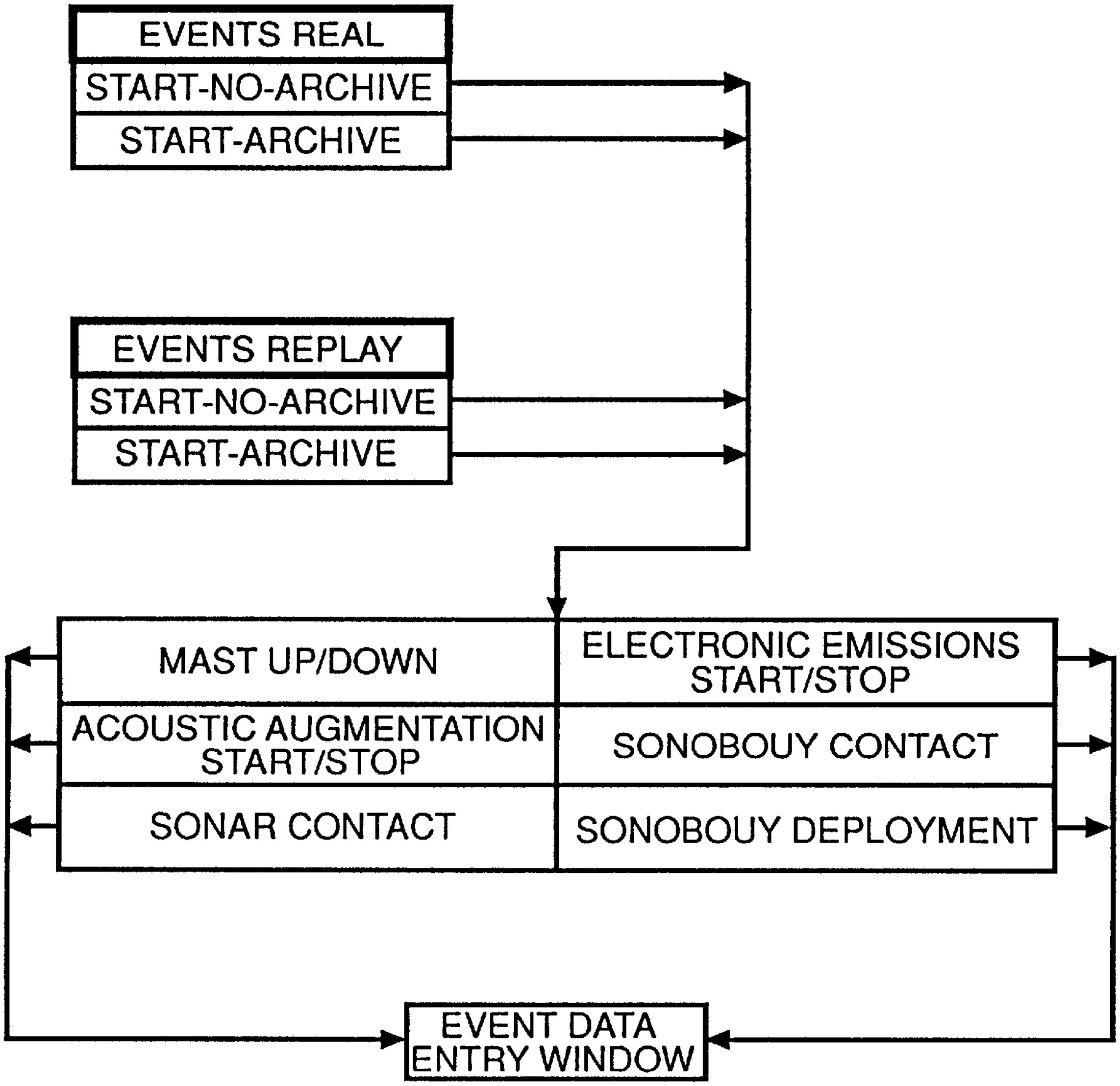
FIG. 7 presents a flow chart for explaining the processing of the EVENTS applications of the REPLAY module.

Upon selecting either START option an event entry sub-menu is presented providing the operator a choice of various pre-defined events for entry. The events list, as illustrated in FIG. 7, is intended to provide a representative list of possible event entry data items. Upon selecting a given event, the operator is provided a data entry window (not shown) within which the necessary parameters for a complete entry of the chosen event may be entered.

Similar to selecting the EVENTS-REAL TIME application, when the operator selects the EVENTS-REPLAY application, of the REPLAY module, the operator is provided a sub-menu offering two choices, START-NO-ARCHIVE, and START-ARCHIVE. Selecting either of these selections presents the same functions as described above for the EVENTS-REAL TIME option. The only difference being that when operating within the EVENTS-REPLAY mode the event data is accepted into the archive LIBRARY as an archive file and can be reviewed along with other archive files. Events entered when operating within the EVENTS-REAL TIME mode are not archived.

Now referring to FIG. 2, the EVENT LOG application of the REPLAY module provides a scrolled list (not shown) of significant events entered into the system either through manual event entry by an operator or from previously recorded events in an archive file. As new events are entered into the system, they will be inserted into the scrolled list in a time ordered manner with the most recent event at the top of the list. The EVENT LOG displays both shore entered and shipboard entered events within the same list. The purpose of the EVENT LOG application is to provide a log of actions and reports that took place during a given exercise. It is preferred that the logged events are stored to a standard ASCII file for hardcopy purposes.

In light of the above, it is therefore understood that within the scope of the appended claims, the invention may be practiced otherwise than as specifically described herein.

What is claimed is:

1. A method of reviewing aboard one of a multiple of naval military platforms, the operational performance of the multiple naval military platforms operating in a joint military exercise comprising the steps of:

periodically detecting and measuring selected operational parameters of at least one of said platforms;

recording said measured operational parameters as a function of time;

storing said recorded parameters within an archive library;

recalling said stored operational parameters from said library for subsequent display and analysis; and transmitting said recorded operational parameters from one platform to at least one other platform.

2. The method of claim 1 including the step of generating graphical displays using said recalled parameters.

3. The method of claim 2 further including the step of sequentially displaying a series of said graphical displays in chronological order.

4. The method as claimed in claim 3 including the step of pairing the recalled parameters of two platforms and generating a combined graphical display using said paired parameters.

5. The method of claim 4 wherein said storing step includes storing said recorded operational parameters on a magnetic media.

6. The method of claim 5 wherein said step of pairing recalled parameters generates and displays the angle between a first platform and a second platform.

7. The method of claim 5 wherein said step of pairing recalled parameters generates and displays the speed of a first platform relative to a second platform.

8. The method as claimed in claim 3 including varying the rate at which said recalled operational parameters are sequentially displayed.

9. The method as claimed in claim 1 further including the step of receiving exercise parameters from at least one other platform.

10. The method of claim 9 further including the steps of:

storing said received exercise parameters within said archive library;

recalling selected ones of said stored exercise parameters from said archive library; and graphically displaying said recalled operational parameters and said recalled exercise parameters.

11. A system for use on a platform taking part in a joint exercise of a plurality of platforms for reconstruction and analysis of operational performance data of at least one of the platforms, the system comprising:

an archive module to record and save the data;

a communications module to transfer data between platforms; and a replay module to display selected data for review and analysis.

12. The system of claim 11 wherein the archive module further comprises:

an automatic entry module to record and save selected data taken from a group of data types consisting of at least ownship data, contact data, weapon system data and communications data;

a manual entry module to accept manual data input by an operator of the system; and a rectify module to correct recorded data to conform to known data.

13. The system of claim 12 wherein the automatic entry module operates simultaneously with the communications and replay modules.

14. The system of claim 12 wherein the manual entry module calculates performance data based on the manual data being reference data.

15. The system of claim 12 wherein the manual entry module merges the manual data recorded data.

16. The system of claim 12 wherein the rectify module further corrects internal data to conform to the known data.

17. The system of claim 11 wherein the communications module further comprises:

a create module to initiate communication between platforms;

a summary module to provide a listing of all communications between the platforms; and an automated message module to periodically transfer updated data between platforms.

18. The system of claim 11 wherein the replay module further comprises a real time module to display the data as the archive module records the data.

19. The system of claim 12 wherein the communications module further comprises:

a create module to initiate communication between platforms;

a summary module to provide a listing of all communications between the platforms; and an automated message module to periodically transfer updated data between platforms.

20. The system of claim 12 wherein the replay module further comprises a real time module to display the data as the archive module records the data.

* * * * *